Figure 1:
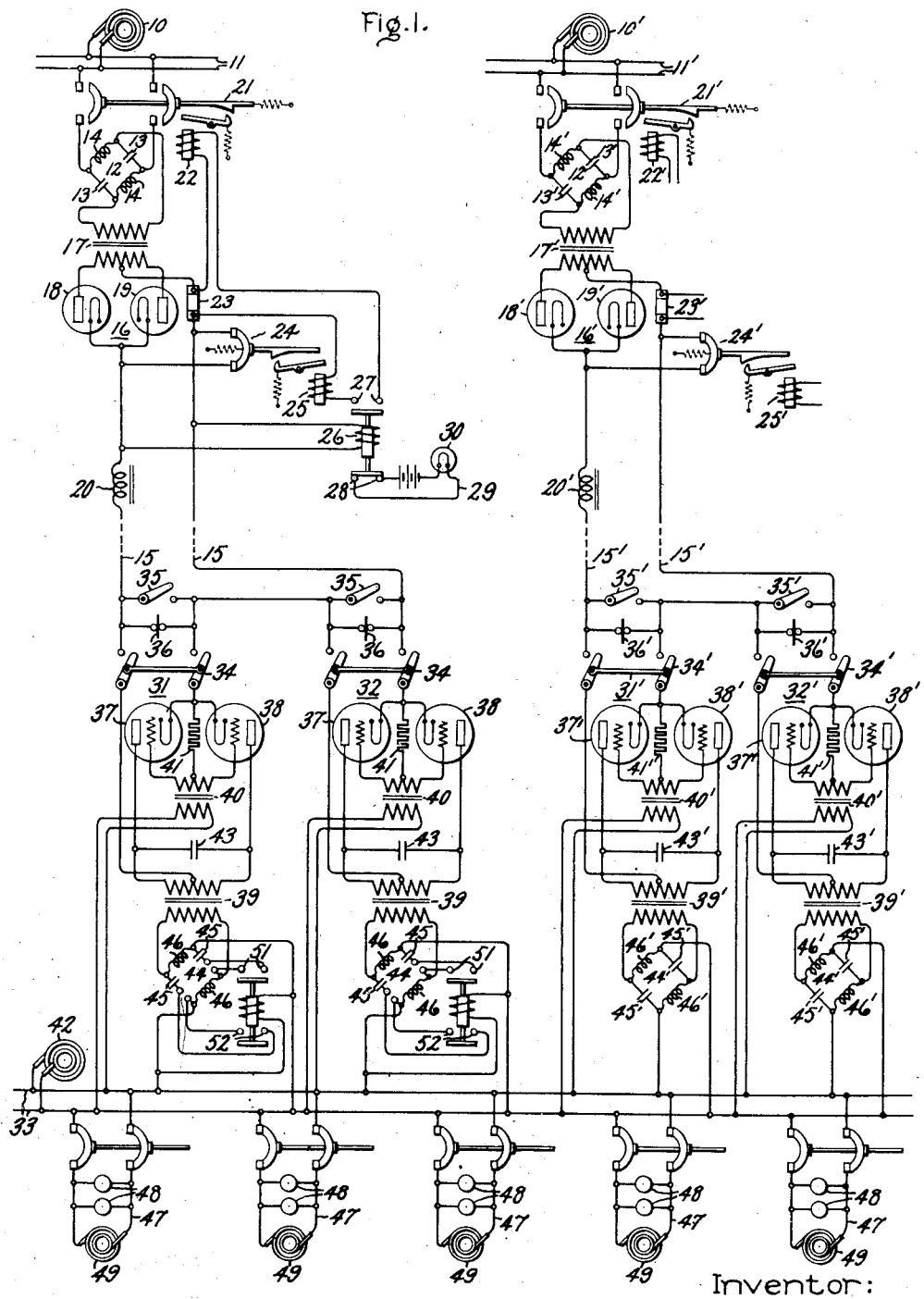

Patented Feb. 12, 1935

1,990,759

UNITED STATES PATENT OFFICE 1,990,759

ELECTRIC POWER TRANSMISSION AND DISTRIBUTION

Charles W. Stone, Schenectady, N. Y., assignor to General Electric Company, a corporation of New York Application May 9, 1934, Serial No. 724,706

24 Claims. (Cl. 171—97)

My invention relates to the transmission and distribution of electric power with direct current and more particularly to the transmission and distribution of electric power to consumers in cities and towns.

The present system of alternating current distribution used in our principal cities and towns is a development of the small generating station which was used following the introduction of the alternating current system. These generating stations, usually relatively close to the power consumer, were originally operated at approximately 2300 volts and in most cases, the generators were single phase and operated at various frequencies. With the introduction of the polyphase system that system was generally adopted for large power purposes although single phase was used for lighting and small powers. As the demands for power increased, it was soon found that it was necessary to build new generating stations which were located farther away from the load, and these stations were built to operate three phase and at much higher voltages such as 6600- 11,000- 13,200- 22,000 volts. As the distributing systems were already built to operate at 2300 volts, it become necessary to build substations to reduce the higher voltage received from the generating stations. This has resulted in building up three separate network systems, namely, (1) the network of high voltage generating stations which are interconnected by tie-lines, (2) the substations which reduce the high voltages used for the primary distribution to the lower 2300 volts required for the general distribution system and (3) the low voltage 120/240 volt networks single phase system or the 120/208 volt, three phase, four-wire network system.

It is an object of my invention to provide an improved direct current system of transmitting and distributing electric power which will overcome many disadvantages of the alternating current system and which will be simple, economical and reliable in operation.

It is another object of my invention to provide an improved system of electrical distribution suitable for supplying electric power to consumers in densely or relatively densely settled communities.

It is another object of my invention to provide an improved system of transmission and distribution of electric power whereby the network systems of generating stations and the primary distribution network of the present alternating current systems may be eliminated where conditions permit or the primary distribution network modified so as to eliminate expensive substations and interconnections.

It is a further object of my invention to provide an improved system of transmission and distribution of electric power whereby the regulation of voltage at the receiving point is under the direct control of the generating station.

It is a still further object of my invention to provide a new and improved arrangement for transmitting power from an alternating current source of constant voltage to a constant voltage alternating current receiving circuit by means of a direct current system at constant current with converting and inverting apparatus comprising electric discharge devices.

A system of transmission and distribution wherein electric power is transmitted from a constant voltage alternating current source to a constant voltage alternating current receiving circuit, or circuits, by means of constant direct current has been described and claimed in my copending application Serial No. 724,705, filed May 9, 1934, and assigned to the assignee of the present application. In the several embodiments of that system the various receiving circuits are not interconnected, or, if interconnected, are interconnected through an existing standard alternating current primary distribution network with the inverting stations otherwise independent. In accordance with my present invention I utilize the general features of the above-identified copending application of transmitting power from a source of constant voltage alternating current, through constant voltage-constant current transforming means and rectifying means, to a feeder over which the power is transmitted as constant direct current.

According to one embodiment of my invention, a plurality of inverters are connected in series in each constant direct current feeder and are connected in parallel on the low voltage distribution network. Briefly stated, the general feature of my invention is to eliminate all substations and the entire network corresponding to the usual 2300 volt network, as used in the present alternating current system. With my system, the low voltage network system can be fed at any number of points where convenient and the tremendous amount of copper now used for the 2300 volt network can be saved as well as the losses in this network and the losses in the transformers now used to feed it, their cost and the cost of their installation.

In accordance with another embodiment of my invention, I modify the existing 2300 volt network of the usual alternating current system where conditions are such as to favor its retention by operating it as a constant current alternating current network rather than as a constant voltage alternating current network. To feed this network from the constant direct current feeder of the type used in the previously described embodiment, I provide a plurality of substations of an aggregate capacity necessary for the network, each consisting of an inverter with its output transformer connected in series in the existing 2300 volt system. Transforming means such as the monocyclic square is interposed between this network and the low voltage distribution system so as to transform the constant alternating current to constant potential alternating current.

The novel features which I believe to be characteristic of my invention are set forth with particularity in the appended claims. The invention itself, however, will be better understood by reference to the following description taken in connection with the accompanying drawings in which Fig. 1 shows diagrammatically one embodiment of my invention which is particularly adapted for transmitting power at constant direct current from a constant potential alternating current source to a low voltage alternating current distribution circuit without the use of any intermediate network systems, and Fig. 2 shows diagrammatically another embodiment of my invention, which is a modification of the arrangement shown in Fig. 1, wherein a series circuit constant alternating current network system is interposed between the constant potential alternating current source and the constant voltage alternating current low voltage network.

Figure 2:
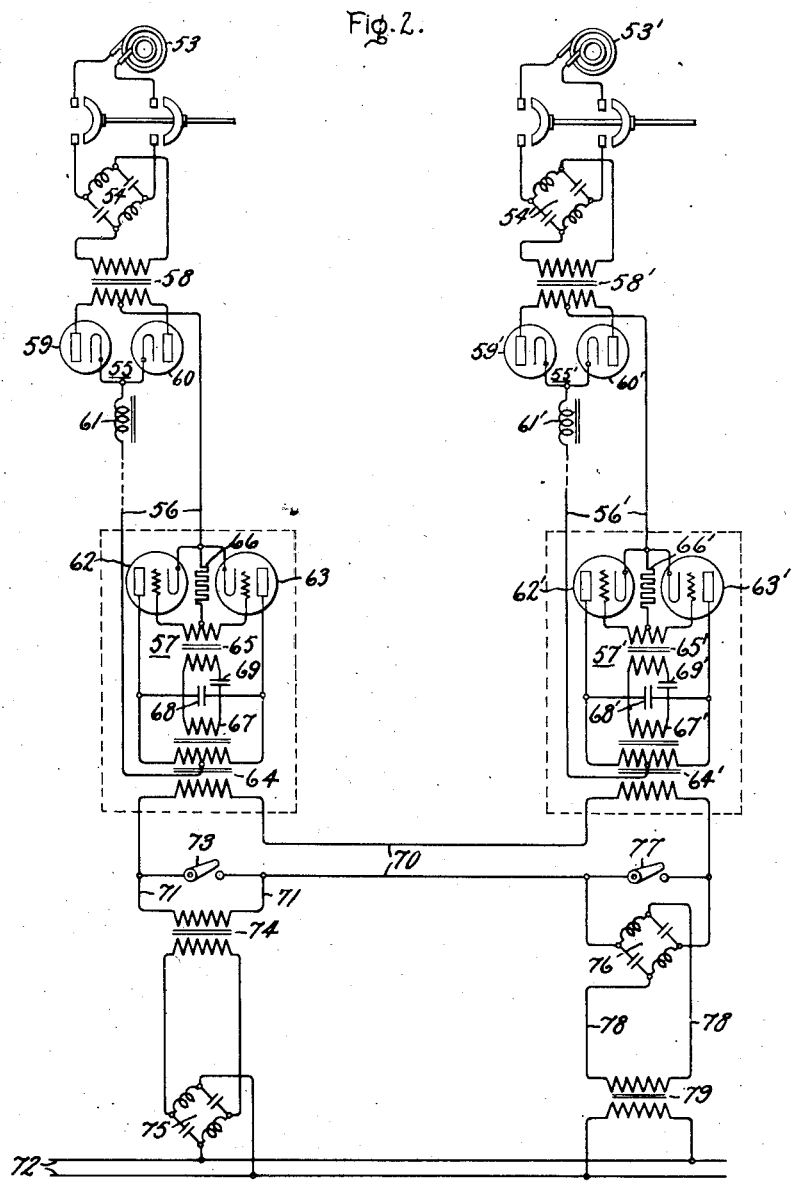

Referring now to Fig. 1 of the drawings, I first derive an alternating current of constant value from a bus 11, which is energized by a source of alternating current 10 of constant voltage, by means of a combination 12 of reactances of opposite sign, such for example as capacitors 13 and inductors 14 arranged alternately in the form of a square and known in the art as the monocyclic square. There are various other methods of transforming from constant voltage to constant current, such as by the constant current transformer and other combinations of capacitive and inductive reactances which may be used without departing from my invention in its broader aspects although I heve found that the monocyclic square gives very satisfactory results for single phase systems at this point in my system. The contant potential alternating current circuit is connected to alternate points of the square and the conjugate points of the square are connected to supply alternating current of constant value. The constant current output from the square 12 is rectified for the direct current feeder circuit 15 by a rectifier 16. The rectifier 16 comprises a transformer 17 and a pair of electric discharge devices 18 and 19 connected in a well known manner to provide full wave rectification. The electric discharge devices 18 and 19 are each provided with an anode and a cathode and may be any of the several types known in the art, although I prefer to use discharge devices of the vapor or gaseous type.

Although I have described an arrangement in which alternating current of constant voltage is first transformed into alternating current of constant value, it will occur to those skilled in the art that the alternating current of constant voltage may be first rectified and a grid controlled rectifier employed for maintaining constant current in the feeder circuit in a known manner without departing from my invention in its broader aspects. The illustrated arrangement, however, is at present preferred by reason of the better wave form obtained with the two-electrode valve type of full wave rectifier and the better power factor conditions in the generator circuit with this type of valve.

The direct current terminals of the rectifier 16 are connected to the feeder circuit 15 through a smoothing reactor 20 connected in series relation therewith. Interposed between the alternating current bus 11 and the input terminals of the monocyclic square 12 is a circuit interrupting device 21 provided with a tripping mechanism 22 connected to be energized in accordance with the current in the feeder 15 through a current shunt 23 in a manner to cause the interrupting device 21 to be opened in the event of an open circuit in the feeder. A short circuiting switch 24 with a tripping mechanism 25 is connected across the feeder 15. The tripping mechanism 25 is connected to be energized in accordance with the current in the tripping circuit of switch 21 so that in the event of an open circuit in the feeder the short-circuiting switch 24 will be closed to short-circuit the feeder 15 at the same time that the circuit interrupter 21 is opened. In certain cases the circuit interrupter or the short-circuiting switch may be used alone to provide the desired protection. A short circuit anywhere on a constant direct current system means that the voltage across the feeder will drop to a value which will just pass the predetermined constant current into the short circuit. To protect against such a fault, I provide a relay 26 having one set of contacts 27 which are connected in series with the current energized tripping mechanisms 22 and 25 and another set of contacts 28 which are connected in a signal circuit 29 to operate a signal 30. The relay 25 is connected to be energized in accordance with the voltage across the feeder 15 so that with a predetermined low voltage under short circuit conditions the contacts 27 will be opened to cause opening of the circuit interrupter 21, closing of the short circuit switch 24, and completion of the signal circuit 29 for operating the signal 30. In this case it is not necessary to interlock the voltage protection means with the current responsive means and it will occur to those skilled in the art that a separate tripping circuit may be employed for the switches 21 and 24 which is controlled by the voltage relay 26 without departing from my invention in its broader aspects.

A plurality of inverters 31 and 32, respectively, are connected in series relation with respect to their input circuits in the feeder 15 and in parallel relation on a low voltage network system 33. The total kilowatt capacity of these inverter stations will be equal to the capacity of the feeder 15. The inverting stations 31 and 32 will receive the constant direct current of feeder 15 and will invert this direct current into constant voltage alternating current. Only one inverting station, namely 31, will be described in detail since the apparatus in the station 32 is intended to be a duplicate of the apparatus contained in station 31 for the purpose of illustrating this embodiment of my invention. It will, of course, be obvious that the details of the respective inverting stations need not be duplicates since it will occur to those skilled in the art that various other known types of electric valve inverters with other arrangements of grid control and other known arrangements of transforming from alternating current of constant value to constant potential alternating current may be used in one or more of the other inverting stations without departing from the invention in its broader aspects.

The station 31, and similarly the station 32, is connected in series relation with the feeder 15 through a disconnect switch 34. Each station is also provided with a short-circuiting switch 35 and a film cutout 36. The apparatus for converting the constant direct current of the circuit 15 to alternating current of constant value may be any of the several types well known in the art and I have illustrated, by way of example, an apparatus similar to that disclosed and claimed in United States Letters Patent No. 1,800,002, granted April 7, 1931, upon an application of E. F. W. Alexanderson. The inverting arrangement as illustrated comprises a pair of electric valves 37 and 38 connected to the primary winding of a transformer 39 for inverting the constant direct current to alternating current of constant value. The valves 37 and 38 are preferably of the vapor electric type and are each provided with an anode, a cathode and a control electrode or grid which is connected to the common cathode circuit of these valves through opposite halves of the secondary winding of a grid transformer 40 and a current limiting resistor 41. The primary winding of the grid transformer 40 is connected to be energized from the distribution network 33 which is provided with an alternating current source 42 for determining the frequency of the inverted alternating current. A capacitor 43 is connected between the anodes of the valves 37 and 38 to commutate the current between these valves. The constant alternating current traversing the secondary winding of transformer 39 is transformed to alternating current of constant voltage by any suitable means which, for example, as illustrated comprises a monocyclic square 44 having two capacitors 45 and two inductors 46 arranged alternately in the form of a square. The output terminals of the square are connected to the network 33. A number of low voltage feeder circuits 47 are connected to the low voltage network system 33 as representative of a typical low voltage network system in a city, town or relatively densely settled community. The load devices indicated as lamps 48 and motors 49 are intended to represent any of the various consumer loads. While I have shown diagrammatically a single network 33, it will occur to those skilled in the art that a network system comprising different network circuits may be fed from different constant direct current feeder circuits without departing from my invention in its broader aspects.

In case of any trouble on the low voltage network 33, such as a ground or a short circuit or a lesser overload, the demand for power from the inverter nearest the trouble will be increased, but the inverter being fed from a constant current feeder can only obtain a constant amount of current and while the voltage of the system may increase, the primary winding of the transformer of the inverter, being connected in series with the feeder, tends to saturate so that the resulting voltage on the secondary winding will tend to decrease, thus limiting the flow of power into the network with the voltage fixed by the other inverters. However, in order not to rely solely on the inherent action of the inverter I have provided a protective arrangement for each inverter when the voltage on the output side tends to decrease below a predetermined value. A suitable arrangement consists in providing a relay connected to be energized across the output terminals of its associated inverter with contacts 51 and 52 arranged to open the capacitor circuits of the square when the output voltage drops below a predetermined value. This arrangement causes the secondary winding of the transformer to feed current through the reactors 46 of the square in series relation to the network so that the reactors operate to limit the flow of power to the network.

Other constant direct current feeders from the same generating station or from a different generating station may be arranged in a similar manner and similarly operated as the arrangement just described for feeder 15. As illustrative of a plurality of feeders I have shown another generating station bus 11', rectifier station 16', feeder circuit 15' and series connected inverter stations 31' and 32' and have designated the corresponding elements of this additional feeder circuit for purposes of ready identification by like numerals which are primed. In order not to complicate the drawing unnecessarily I have merely indicated the various protective features which are shown in detail in connection with feeder 15. The protective features so indicated are intended to be illustrative of the same protective features, in function and operation, as have been shown in detail in connection with feeder 15. Similarly, the monocyclic squares 44' may be provided with the voltage responsive relay similar to the relay as shown in connection with the monocyclic square 44.

The general principles of operation of the converting and transforming apparatus referred to in the above-described system will be understood by those skilled in the art and it may be briefly summarized as follows: The alternating current of constant voltage delivered to the bus 11 is transformed to alternating current of constant value by the monocyclic square 12, rectified by the rectifier 16 to provide full wave rectification in a well known manner to deliver to the feeder 15 direct current of constant value. Direct current of constant value is delivered to the series connected inverter stations 31 and 32 and inverted and supplied to the network 33 as constant voltage alternating current. A detailed explanation of the operation of the inverting apparatus may be found in the above-mentioned Patent No. 1,800,002. Briefly stated, the direct current is converted into alternating current by means of the electric valves 37 and 38 and their associated grid circuits, the transformer 39, and the commutating capacitor 43. Assuming that the valve 37 is initially made conducting, current will flow from the direct current line through the left-hand portion of the primary winding of transformer 39, through the valve to the circuit 15. As the direct current is building up in this portion of the primary winding of transformer 39, a still more negative potential will be induced at the right-hand terminal of the primary winding, the potential being approximately twice that of the left-hand portion. When the valve 38 is made conducting, the capacitor 43, which has been changed to twice the potential impressed across valve 37, is short-circuited through the valves 37 and 38 in series and tends to send a current in the reverse direction through the valve 37, thus completely interrupting the current in this valve. Before the capacitor 43 becomes completely discharged, the grid of the valve 37 has become negative and maintains this valve non-conductive during the next half cycle. In this manner current is successively transferred between the valves 37 and 38 and an alternating current is delivered to transformer 39. The monocyclic square 44 comprising the capacitors 45 and inductors 46 adjusted for a state of resonance, transforms the alternating current of constant value to alternating current of constant voltage in a manner well understood in the art.

The operation of the system as a whole under the various conditions likely to be encountered in practice will be briefly considered. With this system the low voltage network system can be fed at any number of points where convenient and there may be provided a multiplicity of feed points from different feeders. Electric power can be supplied from a single generating station or a multiplicity of generating stations which can be operated at the same frequency or at different frequencies. Since all the power sent out to the distributing system is constant direct current, the question of keeping the stations in phase no longer exists and tie lines will not be necessary. The circuit interrupter 21 need not be a large capacity oil circuit breaker because under the usual operating conditions of my system I prefer to first short-circuit the feeder, when trouble occurs or it is desired to open the circuit for operating reasons, thereby reducing the load before it is disconnected from the system. In case any conductor of the series direct current circuit develops an open circuit there will be a tendency on the system to a large rise in voltage, although the voltage is limited by the rectifier feeding the system. The current relays 22 and 25 will then be deenergized so as to permit the feeder to be short-circuited and the alternating current supply circuit interrupted. In the event of a short circuit anywhere on the constant direct current circuit the energization of the voltage relay 26 will decrease so that the signal 30 will be operated, the short-circuiting switch 24 closed, and the circuit interrupter 21 in the supply circuit opened. In case of a short circuit in any part of the inverter apparatus there would be a reduction in the load furnished by the inverter but this would not affect other inverters connected in series on the same feeder. In case of an open circuit in the inverter apparatus protective means shown as the film cutout 36 is operative under excess voltage conditions to short-circuit the inverter station. As each inverter station inverts from constant direct current to constant voltage alternating current it will deliver constant voltage at all loads at any power factor and hence no automatic feeder voltage regulators need be furnished since the voltage of the low voltage network follows the constant current fixed at the generating stations. It is thus evident that the voltage regulation at the point of utilization is dependent entirely upon the maintenance of constant current at the generating station or the point from which the power is received instead of being cut in the system as with the present alternating current systems.

The system which I have described above eliminates the 2300 volt network which now exists in many places in the standard alternating system, and while this can be done to advantage in most places, there may be conditions where it would be advisable to continue a system somewhat similar to the 2300 volt system. In Fig. 2 I have shown another embodiment of my invention which is adapted for use where it is not desirable to eliminate the 2300 volt network and in accordance with my invention this network is to be operated as a constant alternating current network rather than a constant voltage alternating current network. I feed this network from a source of alternating current 53 through a monocyclic square 54, a rectifier 55, a constant direct current circuit 56, and an inverting substation 57. The rectifying station comprises a transformer 58 and a pair of electric valves 59 and 60 connected to the transformer for full wave rectification. A smoothing reactor 61 is connected in series relation with the circuit 56. The inverting station 57 is connected in series with the constant direct current circuit 56 and may be any of the several types known in the art although I have shown the same type of inverter as is shown in Fig. 1 which comprises a pair of electric valves 62 and 63 connected to the primary winding of a transformer 64 for inverting the constant direct current to alternating current of constant value. These valves are preferably of the vapor electric type and are each provided with an anode, a cathode and a control electrode or grid which is connected to the common cathode circuit of the valves through opposite halves of the secondary winding of a grid transformer 65 and a current limiting resistor 66. The primary winding of the grid transformer 65 is energized from some portion of the alternating current circuit of the apparatus, for example a tertiary winding 67 of the transformer 64. A capacitor 68 is connected between the anodes of the valves 62 and 63 to commute the current between these valves and a capacitor 69 is connected in series with the primary winding of grid transformer 65 to determine the frequency of the inverted alternating current. The secondary winding of transformer 64 is connected in series relation with the network circuit 70 to deliver constant alternating current thereto. A similar circuit arrangement for feeding constant alternating current to the network, which is intended to be illustrative of a plurality of sources of supply, is shown by the same circuit arrangement of corresponding elements designated by the same reference numerals which are primed. A constant alternating current feeder circuit 71 is connected in series relation with the network 70 and may be run to the low voltage network 72. At the point of connection to the circuit 70 I provide a short-circuiting switch 73. At the point of feed to the low voltage network I provide a transformer 74 which has its secondary winding connected to a monocyclic square 75 for transforming the constant alternating current to constant voltage alternating current at the low voltage network 72. In case it is desirable to transmit the power to the network 72 at constant voltage alternating current the arrangement illustrated on the feeder circuit to the right may be used. In this case I connect the input terminals of a monocyclic square 76 in series relation with the network 70. A short-circuiting switch 77 is connected across the input terminals of the square. The output terminals of the square supply constant voltage alternating current to a feeder circuit 78 which is connected to supply electric power to the low voltage network 72 through a suitable transformer 79.

The operation of the arrangement illustrated in Fig. 2, it is believed, will be readily understood from the description of the rectifying, inverting and transforming steps explained in detail in connection with the operation of Fig. 1. Starting with the constant voltage alternating current source the current is transformed to alternating current of constant value which is rectified and supplied to the feeder as constant direct current. The inverting stations furnish constant alternating current to the intermediate network and this current is then supplied to the low voltage network through the monocyclic square as constant voltage alternating current. Similar to the arrangement shown in Fig. 1, the regulation of voltage at the receiving point is under the control of the apparatus installed in the generating station which is a very important point with system operation.

Although the various alternating current circuits have been illustrated as single phase circuits for simplifying the description of my invention, it will occur to those skilled in the art that various polyphase arrangements may be substituted for the single phase circuits, particularly the rectifying and inverting stations, to obtain better economy and improved operating conditions without departing from my invention in its broader aspects.

While I have shown and described several embodiments of my invention, it will be obvious to those skilled in the art that various changes and modifications may be made without departing from my invention in its broader aspects and I, therefore, aim in the appended claims to cover all such changes and modifications as fall within the true spirit and scope of my invention.

What I claim as new and desire to secure by Letters Patent of the United States, is:—

1. In combination, an alternating current network system, a plurality of feeder circuits, and means for energizing said alternating current system at a plurality of spaced points comprising inverting apparatus connected in series relation with each feeder circuit, and a plurality of transforming apparatus each having its input circuit connected to be energized from said inverting apparatus and having all the output circuits of the respective transforming apparatus connected to said alternating current system.

2. In combination, a constant voltage alternating current network system, a plurality of constant direct current feeder circuits, and means for energizing said alternating current system at a plurality of spaced points comprising electric valve inverting apparatus connected in series relation in each of said feeder circuits, and transforming means associated with each of said inverting apparatus and each including a monocyclic square having an input circuit connected to be energized from its associated inverting apparatus and all the output circuits of the respective monocyclic squares being connected to said alternating current system.

3. In combination, a constant voltage alternating current circuit, a plurality of constant direct current feeder circuits, and means for energizing said alternating current circuit at a plurality of spaced points comprising electric valve inverting apparatus connected in series relation in each of said feeder circuits, and transforming means associated with each of said inverting apparatus and each including a network of reactances of opposite sign having an input circuit connected to be energized from its associated inverting apparatus and all of the output circuits of the respective networks being connected in parallel relation to said alternating current circuit.

4. The combination in a system for transmitting electric energy, of means in the supply end of the system for producing constant direct current from a source of constant voltage alternating current, and means including a plurality of inverters of the electric discharge type for producing constant voltage alternating current from said constant direct current, said inverters being connected in series relation with respect to their input circuits and in parallel relation with respect to their output circuits.

5. The combination in a system for transmitting electric energy from a source of constant voltage alternating current to a constant voltage alternating current receiving circuit, of means including an electric valve rectifier in the supply end of the system for producing constant direct current from said source of constant voltage alternating current, and a plurality of transforming units each including an electric valve inverter and a network of reactances of opposite sign for producing constant voltage alternating current from said constant direct current, said inverters being connected in series relation with respect to said constant direct current and the output circuits of said network being connected in parallel relation with said receiving circuit.

6. In combination, a plurality of feeder circuits each energized by constant direct current, an alternating current circuit, and a plurality of inverters for energizing said alternating current circuit from said feeder circuits, different inverters of said plurality of inverters being connected in series relation with the respective feeder circuits and all of said inverters being connected in parallel relation with said alternating current circuit.

7. In combination, a plurality of feeder circuits each energized by constant direct current, an alternating current circuit, a plurality of electric valve inverters for energizing said alternating current circuit from said feeder circuits, different inverters of said plurality of inverters being connected in series relation with the respective feeder circuits, and a plurality of networks of reactances of opposite sign connected one to each inverter for changing the constant alternating current of its associated inverter to constant voltage alternating current, the output circuits of said networks being connected in parallel relation with said alternating current circuit.

8. In combination, a plurality of separate and independent sources of constant voltage alternating current, means including a rectifier connected one to each of said sources for converting the constant voltage alternating current of each of said sources to constant direct current, a plurality of feeder circuits connected one to each of said rectifying means, a constant voltage alternating current network, and means for energizing said network from said feeder circuits at a plurality of spaced points comprising a plurality of inverters connected in each feeder circuit in series relation with the feeder associated therewith and having the output circuits of all of said inverters connected in parallel relation with said alternating current network.

9. In combination, a plurality of separate and independent sources of constant voltage alternating current, means including a converting unit comprising a plurality of reactances of opposite sign and an electric valve rectifier connected with one unit to each of said sources for converting the constant voltage alternating current of each of said sources to constant direct current, a plurality of feeder circuits connected one to each of said rectifying means, a constant voltage alternating current network, and means for energizing said network from said feeder circuits at a plurality of spaced points comprising a plurality of electric valve inverters connected in each feeder circuit in series relation with the feeder associated therewith and a plurality of transforming units each comprising a plurality of reactances of opposite sign connected one with each inverter and having all the output circuits of said transforming units connected in parallel relation with said alternating current network.

10. In an electrical system of transmission and distribution, a source of constant voltage alternating current, means including a rectifier for converting said constant voltage alternating current to constant direct current, a plurality of feeder circuits connected to said rectifying means, an intermediate network circuit, a plurality of inverters connected one in each feeder circuit and to said intermediate network for changing the constant direct current of each feeder circuit to constant alternating current in said intermediate network, a relatively low voltage distribution network, and means having a plurality of input circuits connected in series relation with said intermediate network, and a plurality of output circuits connected in parallel relation with said low voltage network for energizing said low voltage network with constant voltage alternating current.

11. In an electrical system of transmission and distribution, a source of constant potential alternating current, means including a network of reactances of opposite sign and an electric valve rectifier for converting said constant voltage alternating current to constant direct current, a plurality of feeder circuits connected to said rectifier, an intermediate network circuit, an electric valve inverter interconnecting each feeder circuit and said intermediate network for changing the constant direct current of each feeder circuit to constant alternating current in said intermediate network, and a plurality of transforming units each comprising a network of reactances of opposite sign having the input circuits thereof connected in series relation with said intermediate network and all of the output circuits thereof connected in parallel relation with said low voltage network for energizing said low voltage network with constant voltage alternating current at a plurality of spaced points.

12. In a system of electrical distribution, a constant current transmission circuit, short circuiting means normally non-conductive connected across said transmission circuit, and means operative in accordance with current below a predetermined value in said transmission circuit for rendering said short circuiting means conductive.

13. In a system of electrical distribution, a source of constant voltage alternating current, a transmission circuit, and means for energizing said transmission circuit with constant direct current, a circuit interrupter interposed between said source and said means, short circuiting means normally non-conductive connected across said transmission circuit, and means operative in accordance with current below a predetermined value in said transmission circuit for opening said circuit interrupter and rendering said short circuiting means conductive.

14. In a system of electrical distribution, a source of constant voltage alternating current, a network of reactances of opposite sign connected to said source for transforming the constant voltage alternating current to constant value alternating current, a circuit interrupter connected between said source and said network, rectifying means including electric valve apparatus for converting the constant value alternating current to constant direct current, a transmission circuit connected to the output terminals of said rectifying means, a normally open short-circuiting switch connected across said transmission circuit, and means responsive to the current in said transmission circuit below a predetermined value for opening said circuit interrupter and closing said short circuiting switch.

15. In a system of electrical distribution, a source of constant voltage alternating current, a transmission circuit, means for energizing said transmission circuit with constant direct current, a circuit interrupter interposed between said source and said means, short circuiting means normally non-conductive connected across said transmission circuit, means operative in accordance with current in said transmission circuit below a predetermined value for opening said circuit interrupter and rendering said short circuiting means conductive, and means operative in accordance with the voltage of said transmission circuit below a predetermined value for opening said circuit interrupter and rendering said short circuiting means conductive.

16. In a system of electrical distribution, a source of constant voltage alternating current, a transmission circuit, a network of reactances of opposite sign connected to said source for transforming the constant voltage alternating current to constant value alternating current, a circuit interrupter connected between said source and said network, rectifying means including electric valve apparatus for converting the constant value alternating current from said network to constant direct current, a transmission circuit connected to be energized with constant direct current from said rectifying means, a normally open short circuiting switch connected across said transmission circuit, means responsive to an interruption of current in said transmission circuit for opening said circuit interrupter and closing said short circuiting switch, and means responsive to the voltage of said transmission circuit below a predetermined value for causing said circuit interrupter to be opened and said short circuiting switch to be closed.

17. In a system of electrical distribution, means for providing a constant alternating current, a constant voltage to constant current transforming network comprising inductive and capacitive reactances connected alternately in a closed circuit and having alternate terminals of said network connected to be energized from said constant alternating current means, an electric circuit connected to be energized with constant voltage alternating current from the conjugate points of said network, and means responsive to a predetermined electrical condition of said electric circuit for opening the circuit through the capacitive reactances of said network.

18. In a system of electrical distribution, means for providing a constant alternating current, a monocyclic square comprising inductors and capacitors connected alternately in a closed circuit and having electrically opposite terminals of said square connected to be energized from said constant alternating current means, an electric circuit connected to be energized with constant voltage alternating current from the conjugate points of said square, interrupting means connected in circuit with the capacitors of said square, and means responsive to the voltage across the output terminals of said square for opening said circuit interrupting means.

19. In a system of electrical distribution, a transmission circuit energized with constant direct current, a plurality of electric valve inverters connected in series relation with said transmission circuit, a plurality of monocyclic squares arranged one for each inverter and comprising inductors and capacitors connected alternately in a closed circuit and having electrically opposite points connected to be energized from the constant alternating current circuit of its associated inverter, a constant voltage alternating current distribution circuit, the conjugate points of said squares being connected in parallel relation with said distribution circuit, interrupting means in circuit with the capacitors of each square, and means associated with each square and operative in response to a decrease in voltage below a predetermined value for opening the interrupting means of the square subjected to said decrease in voltage.

20. In a system for transmitting and distributing electric energy, a source of constant voltage alternating current, a transmission circuit, means including an electric valve rectifier for energizing said transmission circuit with constant direct current, a circuit interrupter interposed between said source and said rectifier, short circuiting means normally in open circuit condition connected across said transmission circuit, means operative in accordance with an open circuit in said transmission circuit for opening said circuit interrupting means and closing said short circuiting means, means responsive to a short circuit condition of said transmission circuit for opening said circuit interrupting means and closing said short circuiting means, a plurality of electric valve inverters connected in series relation with said transmission circuit, a switch connected across each of said inverters, means connected across each of said inverters and operative in accordance with an open circuit in its associated inverter for short circuiting said inverter, a relatively low voltage alternating current distribution circuit of constant voltage, and a plurality of transforming units each comprising a network of reactances of opposite sign and arranged one unit for each inverter and each unit having alternate junction points connected to be energized from the constant alternating current circuit of its associated inverter and the conjugate points of the respective squares connected in parallel relation to energize said distribution circuit at spaced points.

21. In a system for transmitting and distributing electric energy, a plurality of sources of constant voltage alternating current respectively independent as to voltage and frequency, a relatively low voltage distribution circuit of constant alternating voltage and frequency, means for interconnecting said sources and said distribution circuit comprising a plurality of transmission circuits each connected to be energized from one of said sources with constant direct current, a plurality of electric valve inverters with one of said inverters connected in series relation with each of said transmission circuits, a plurality of transforming means connected one with each of said inverters for transforming the constant alternating current thereof to constant voltage alternating current and having the output circuits of all of said transforming means connected in parallel relation with said distribution circuit, and means for maintaining constant and uniform the frequency of the alternating current output of all of said inverters.

22. In combination, a plurality of separate and independent sources of alternating current, a relatively low voltage alternating current network of constant voltage, and means for energizing said network from said plurality of sources comprising a plurality of constant direct current transmission circuits and a plurality of groups of electric valve inverters connected with the input circuits of the respective groups in series relation with different transmission circuits and the output circuits of all of said groups connected in parallel relation with said network.

23. In a system of transmission and distribution, a transmitting station comprising a source of constant voltage alternating current, and means for changing said constant voltage alternating current to constant direct current, a transmission circuit connected to be energized by said constant direct current, a plurality of receiving stations each including an inverter and transforming means for changing said direct current of constant value to alternating current of constant voltage, a constant voltage alternating current receiving circuit connected to be energized from said receiving stations, and means for maintaining at a uniform frequency the alternating current delivered by the respective receiving stations.

24. In a system of transmission and distribution, a transmitting station comprising a source of constant voltage alternating current and means including electric valve apparatus in combination with a network of reactances of opposite sign for changing said constant alternating current to constant direct current, a transmission circuit connected to be energized by said constant direct current, a plurality of receiving stations each including an electric valve inverter in combination with a network of reactances of opposite sign for changing said direct current of constant value to alternating current of constant voltage, a constant voltage alternating current distribution network, and means including an alternating current generator connected to said network for maintaining the same frequency in the output circuits of all of said inverters.

CHARLES W. STONE.